United States Patent
Noda et al.

(10) Patent No.: US 10,684,604 B2
(45) Date of Patent: Jun. 16, 2020

(54) NUMERICAL CONTROL APPARATUS ENABLING SPECIFICATION OF A CIRCULAR ARC SHAPE MOVEMENT TRAJECTORY

(71) Applicant: FANUC Corporation, Minamitsuru-gun, Yamanashi (JP)

(72) Inventors: Kouichi Noda, Minamitsuru-gun (JP); Soichiro Ide, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 16/248,176

(22) Filed: Jan. 15, 2019

(65) Prior Publication Data

US 2019/0196437 A1 Jun. 27, 2019

Related U.S. Application Data

(63) Continuation of application No. 14/918,649, filed on Oct. 21, 2015, now Pat. No. 10,429,814.

(30) Foreign Application Priority Data

Oct. 23, 2014 (JP) .................................. 2014-216553

(51) Int. Cl.
*G05B 19/19* (2006.01)
*G05B 19/4093* (2006.01)
*G05B 19/4155* (2006.01)

(52) U.S. Cl.
CPC ......... *G05B 19/19* (2013.01); *G05B 19/4093* (2013.01); *G05B 19/4155* (2013.01);
(Continued)

(58) Field of Classification Search
CPC ................ G05B 19/19; G05B 19/4093; G05B 19/4155; G05B 2219/37607; G05B 2219/39219; Y02P 90/265
See application file for complete search history.

(56) References Cited

U.S. PATENT DOCUMENTS 3,423,656 A * 1/1969 Tripp .................... G05B 19/371
                                                    318/570
4,458,326 A    7/1984 Kinoshita
(Continued)

FOREIGN PATENT DOCUMENTS

JP    S57-50010 A    3/1982
JP    S63-285606 A    11/1988
(Continued)

OTHER PUBLICATIONS

Notification of Reasons for Refusal dated Aug. 23, 2016 in Japanese Patent Application No. 2014-216533 (3 pages) with an English Translation (3 pages).

*Primary Examiner* — Michael D Masinick
*Assistant Examiner* — Hung H Dang
(74) *Attorney, Agent, or Firm* — Faegre Drinker Biddle & Reath LLP (57) ABSTRACT

A numerical control apparatus includes a command argument determination unit which determines whether a vector is included in an argument of a circular arc interpolation command which is included in command data and a circular arc shape forming unit which forms a circular arc shape based on a machining program, and a start point, an end point, and the vector, which are specified by the argument of the circular arc interpolation command, when the command argument determination unit determines that the vector is included in the argument of the circular arc interpolation command.

3 Claims, 8 Drawing Sheets (52) U.S. Cl.
CPC .............. *G05B 2219/37607* (2013.01); *G05B 2219/39219* (2013.01); *Y02P 90/265* (2015.11)

(56) References Cited

U.S. PATENT DOCUMENTS

| | | |
|---|---|---|
| 4,507,738 A | 3/1985 | Nozawa et al. |
| 6,462,738 B1 | 10/2002 | Kato |
| 2007/0185609 A1* | 8/2007 | Endo .................. G05B 19/4103 700/187 |
| 2008/0288103 A1 | 11/2008 | Otsuki et al. |
| 2013/0166059 A1* | 6/2013 | Terada .................. G05B 19/182 700/189 |
| 2013/0218323 A1 | 8/2013 | Otsuki |

FOREIGN PATENT DOCUMENTS

| | | |
|---|---|---|
| JP | H03-196311 A | 8/1991 |
| JP | H05-224721 A | 9/1993 |
| JP | H10-161728 A | 6/1998 |
| WO | WO-2016/024338 A1 | 2/2016 |

\* cited by examiner

G02 Xxn Yyn Zzn Iin Jjn Kkn Lln Mmn

FIG. 2B

EXAMPLE) G00 Xx0 Yy0 Zz0 ;
G02 Xx1 Yy1 Zz1 Ii1 Jj1 Kk1 Ll1 Mm1;
G00 Xx2 Yy2 Zz2 ;
G03 Xx3 Yy3 Zz3 Ll3 ;
G00 Xx4 Yy4 Zz4 ;
G02 Xx5 Yy5 Zz5 ;
G00 Xx6 Yy6 Zz6 ;
G03 Xx7 Yy7 Zz7 ;

FIG. 3

TOOL TRAJECTORY

DIRECTION OF VECTOR

FIG. 4A

G02.7 Xxn Yyn Zzn Iin Jjn Kkn Lln Mmn

FIG. 4B

EXAMPLE)  G00 Xx0 Yy0 Zz0 ;
          G02.7 Xx1 Yy1 Zz1 Ii1 Jj1 Kk1 Ll1 Mm1;

G02.8 Xxn Yyn Zzn Iin Jjn Kkn Lln Mmn Hhn

FIG. 6B

EXAMPLE) G00 Xx0 Yy0 Zz0 ;
G02.8 Xx1 Yy1 Zz1 Ii1 Jj1 Kk1 Ll1 Hh1;

NUMERICAL CONTROL APPARATUS ENABLING SPECIFICATION OF A CIRCULAR ARC SHAPE MOVEMENT TRAJECTORY

CROSS-REFERENCE TO RELATED APPLICATIONS

This application is a continuation of copending U.S. patent application Ser. No. 14/918,649, filed Oct. 21, 2015, which claims the benefit of Japanese Patent Application No. 2014-216553, filed Oct. 23, 2014, the entire contents each of which are incorporated herein by reference.

BACKGROUND OF THE INVENTION

1. Field of the Invention

The present invention relates to a numerical control apparatus and in particular, the present invention relates to a numerical control apparatus which is capable of specifying shapes of a circular arc and a curved surface which have small curvatures.

2. Description of the Related Art

Conventionally, when a circular arc shape is specified by a machining program, a method for specifying a circular arc shape based on a start point, an end point, and a radius from the center is commonly known. Further, a specifying method in which coordinates of a start point, an end point, and a point on a circular arc are specified is also widely known.

Figure 10A:
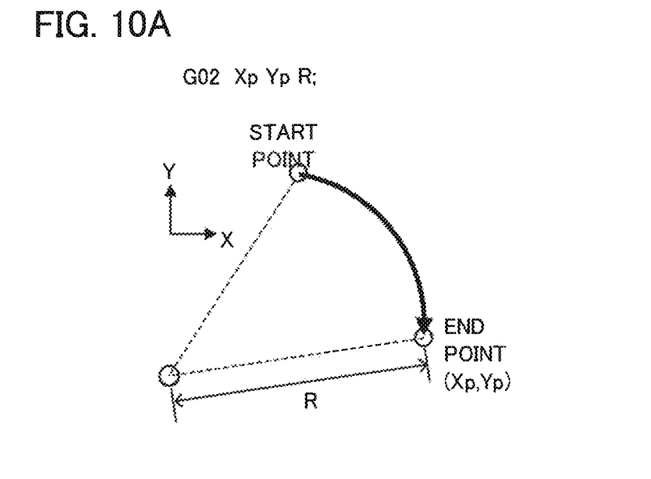
FIGS. 10A, 10B, and 10C illustrate a method for specifying a circular arc shape of prior art technique.
Figure 10B:
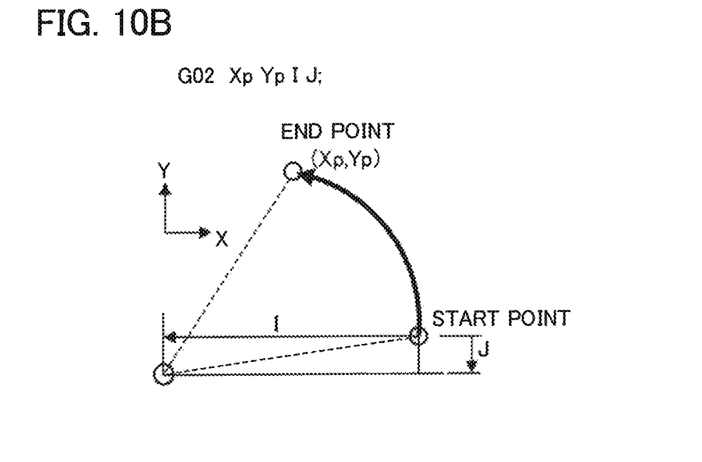

For example, FIG. 10A illustrates an example in which a circular arc shape is specified by a start point, an end point, and a radius from the center. In a circular arc interpolation command "G02 Xp Yp R", Xp denotes an end point coordinate on a first axis of a plane, Yp denotes an end point coordinate on a second axis, and R denotes a distance from the center. Alternatively, a circular arc shape can be specified as illustrated in FIG. 10B. In a circular arc interpolation command "G02 Xp Yp I J", Xp denotes an end point coordinate on a first axis of a plane, Yp denotes an end point coordinate on a second axis, I denotes a distance from a start point of the Xp axis to the center of a circular arc, and J denotes a distance from a start point of the Yp axis to the center of the circular arc.

As another prior art technique for specifying a circular arc shape, a method is disclosed in which one point on a perpendicular bisector, which is orthogonal to a specific plane, of a line segment, which is obtained by connecting a start point and an end point, on the plane is selected so as to form a trajectory on a circular arc for avoidance of an interfering object (for example, Japanese Patent Application Laid-Open No. 10-161728).

Figure 10C:
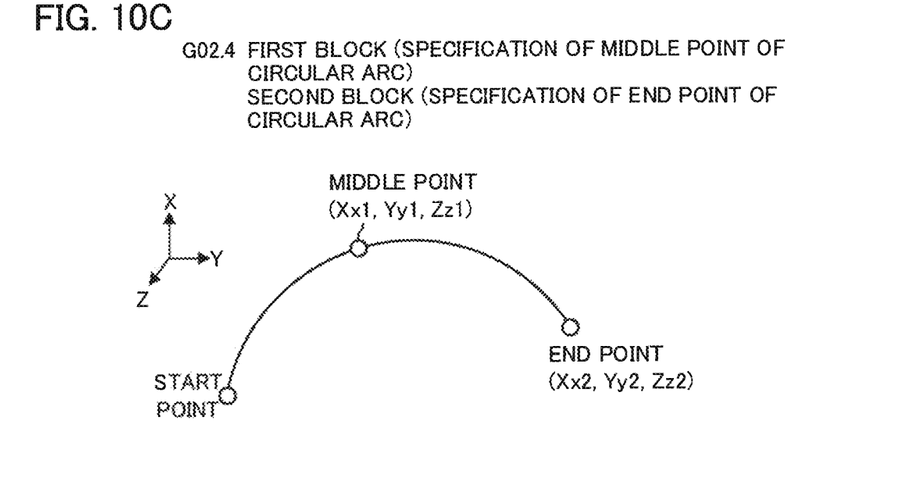

FIG. 10C illustrates an example in which a circular arc shape is specified by specifying a start point, an end point, and a middle point on a circular arc. In this specifying method, a circular arc shape in a three-dimensional space can be specified. In a circular arc interpolation command illustrated in FIG. 10C, Xxn denotes a coordinate on a first axis in a three-dimensional space, Yyn denotes a coordinate on a second axis, and Zzn denotes a coordinate on a third axis.

Figure 11:
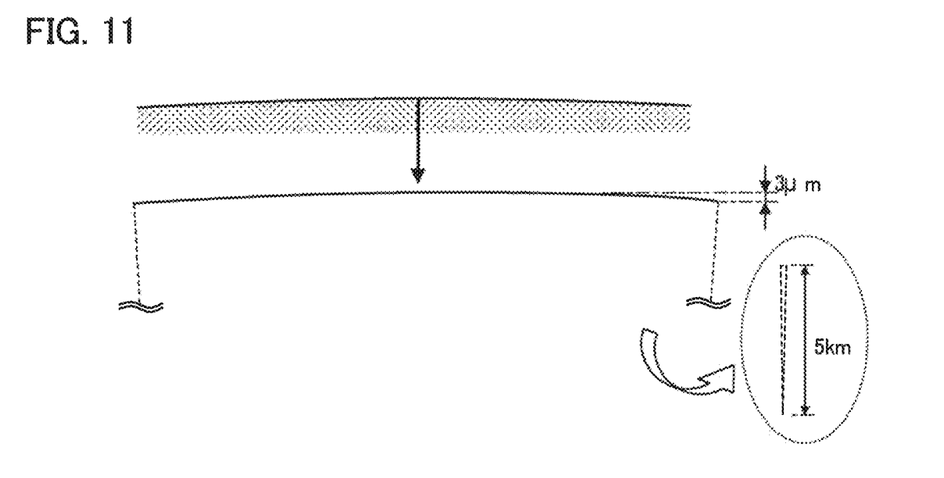
FIG. 11 illustrates a problem of the method for specifying a circular arc shape of prior art technique.

However, in the method for specifying a circular arc shape by a start point, an end point, and a radius from the center, the number of command digits exceeds a specification of a numerical control apparatus and therefore, a circular arc shape cannot be specified in a case where a curvature is exceedingly small such as several µm of a width between the start point and the endpoint and 5 km of a radius from the center as illustrated in FIG. 11, for example. In such a case, a curved surface needs to be specified in a manner to be divided into a minute straight line segments. Therefore, there have been such problems that a CAD/CAM system is separately required and a size of a program is increased.

Further, in the technique described on Japanese Patent Application Laid-Open No. 10-161728, a plane on which a circular arc shape is formed is previously determined, so that it is impossible to form an arbitrary circular arc shape in a three-dimensional space. Further, a point which is specified other than a start point and an end point needs to be set on a perpendicular bisector of a line segment which is obtained by connecting the start point and the end point. Therefore, there is such problem that a load is imposed on an operator who creates a program. Furthermore, in the method described on Japanese Patent Application Laid-Open No. 10-161728, it is impossible to deal with machining of a spherical surface shape and the like.

SUMMARY OF THE INVENTION

An object of the present invention is to provide a numerical control apparatus which is capable of easily specifying a circular arc shape in specification of a circular arc shape by a machining program.

According to the present invention, a numerical control apparatus which enables specification of a movement trajectory of a circular arc shape by a circular arc interpolation command which is included in a machining program includes a program analysis unit which analyzes the machining program so as to acquire command data, a command argument determination unit which determines whether a vector is included in an argument of the circular arc interpolation command which is included in the command data, a circular arc shape forming unit which forms a circular arc shape based on the machining program, and a start point, an end point, and the vector, which are specified by the argument of the circular arc interpolation command, when the command argument determination unit determines that the vector is included in the argument of the circular arc interpolation command, and a tool trajectory forming unit which forms a tool trajectory based on the circular arc shape.

The command argument determination unit may determine whether the circular arc interpolation command is a machining command of a curved surface shape, the numerical control apparatus may further include a spherical surface shape forming unit which forms a spherical surface shape including a circular arc shape which is formed by the circular arc shape forming unit when the command argument determination unit determines that the circular arc interpolation command is a machining command of a curved surface shape, and the tool trajectory forming unit forms a tool trajectory based on the spherical surface shape.

The spherical surface shape may be a hemispherical surface shape including the circular arc shape, or a semicircular column shape.

In the present invention, the above-mentioned configuration is provided, whereby a direction and a length of a vector with respect to a point on a circular arc shape which is specified based on a start point and an endpoint of a circular arc and a point on a straight line obtained by connecting the start point and the end point is specified in specification of a circular arc shape by a machining program. Accordingly, machining in which a circular arc shape is specified is enabled. Therefore, even when the number of command digits of a numerical control apparatus is limited, a circular arc shape and a curved surface shape which have exceedingly small curvatures can be efficiently specified, the size of a storage memory in which the machining program is stored can be reduced, and a workload, which is required for creation and revision of a machining shape, of a machining programmer can be reduced.

BRIEF DESCRIPTION OF THE DRAWINGS

The above-described and other objects and features of the present invention will be apparent from description of the following embodiment in reference to the accompanied drawings. Among these drawings.

DETAILED DESCRIPTION OF THE PREFERRED EMBODIMENT

A method for specifying a circular arc shape in the present invention is first described.

Figure 1A:
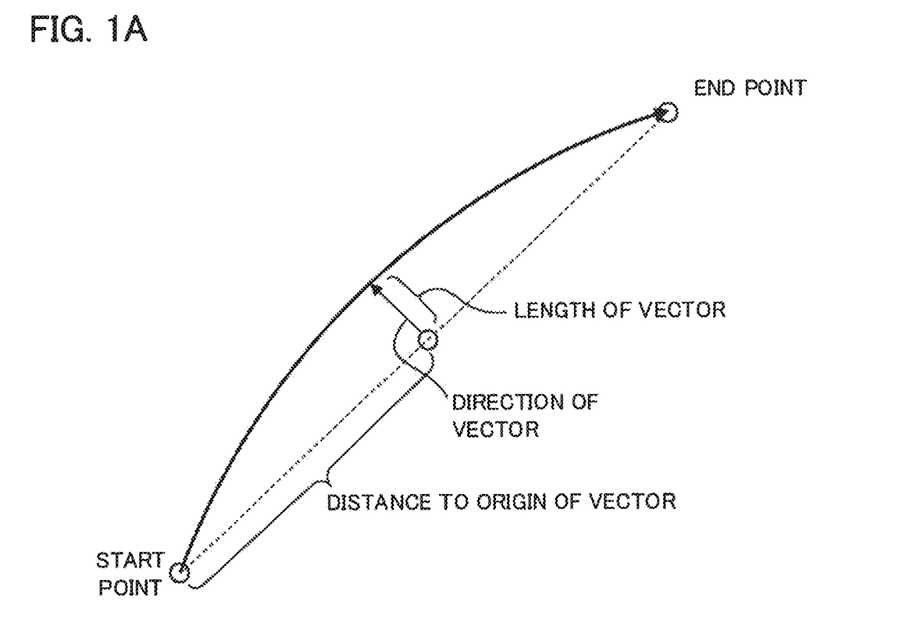
FIGS. 1A and 1B illustrate a method for specifying a circular arc shape according to an embodiment of the present invention.

In the present invention, a circular arc shape is specified by specifying a direction and a length of a vector from a point on a straight line, which is obtained by connecting a start point and an end point, to a point on the circular arc shape and a distance from the start point of a circular arc to an origin of the vector, as illustrated in FIG. 1A.

Figure 2A:
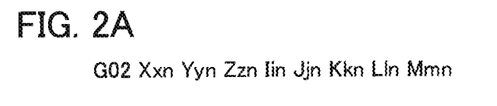
FIGS. 2A and 2B illustrate a method for specifying a circular arc interpolation command according to the embodiment of the present invention.
Figure 2B:
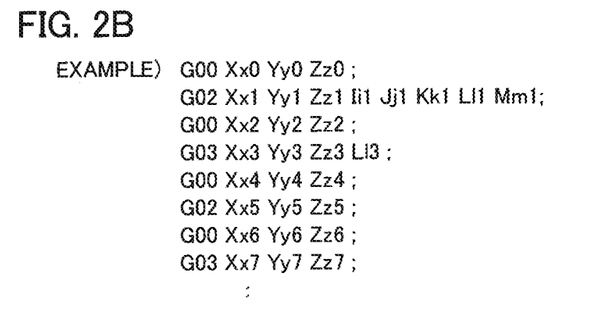

In order to realize such specifying method, a specifying method of a circular arc interpolation command illustrated in FIGS. 2A and 2B is introduced.

In FIG. 2A, Xxn denotes an end point coordinate on an X axis direction, Yyn denotes an end point coordinate on a Y axis direction, Zzn denotes an end point coordinate on a Z axis direction, Iin, Jjn, and Kkn denote a direction of a vector from a point on a straight line, which is obtained by connecting a start point and an end point, Lln denotes a length of the vector, and Mmn denotes a distance from the start point of a circular arc to an origin of the vector.

As illustrated in FIGS. 2A and 2B, circular arc interpolation commands G02 and G03 enables arguments Iin, Jjn, and Kkn for specifying the direction of a vector with respect to a point on a circular arc shape, an argument Lln for specifying the length of the vector, and an argument Mmn for specifying the distance from the start point of a circular arc to the origin of the vector to be specified.

In the present specifying method, a start point of a circular arc shape is defined by a positioning command G00 and the like and then, an end point of the circular arc shape, a direction and a length of a vector with respect to a point on the circular arc shape, and a distance from the start point of a circular arc to an origin of the vector are specified by the circular arc interpolation command G02, for example, so as to provide a moving command of the circular arc shape. Here, in a case where similar circular arc shapes are continuously specified, the specified direction and length of the vector and the distance from the start point of the circular arc to the origin of the vector are taken over to a following block.

Figure 3:
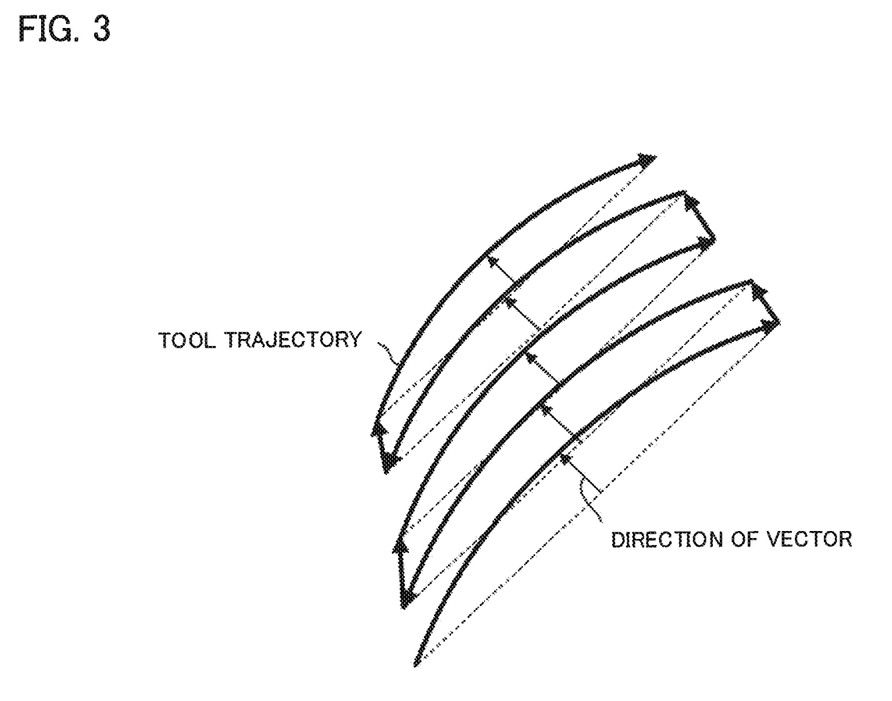
FIG. 3 illustrates a tool trajectory which is calculated in accordance with a program example of the circular arc interpolation command according to the embodiment of the present invention.

Accordingly, in a case of consecutive circular arc shapes which have identical specified directions of a vector, identical lengths of the vector, and identical distances from a start point of a circular arc to an origin of the vector, the shapes can be specified only by specifying an end point of the circular arc. Thus, a size of a storage memory of a program can be reduced compared to methods of prior art. Further, an origin of a vector is usually a middle point on a straight line which is obtained by connecting a start point and an end point. In this case, a distance from the start point of a circular arc to the origin of the vector can be omitted. FIG. 3 illustrates an example of a tool trajectory which is drawn by a descriptive example of the circular arc interpolation command illustrated in FIG. 2B.

A procedure for forming a circular arc shape based on a command, which is specified by a circular arc interpolation command, of a machining program according to the present invention is described below. In a case where a start point coordinate of a circular arc shape is (Xs,Ys,Zs), an end point coordinate of a circular arc shape is (Xe,Ye,Ze), and a distance from the start point coordinate of a circular arc to an origin of a vector is Mm, a coordinate (Xvs,Yvs,Zvs) of the origin of the vector is obtained by using formula (1) below. The start point coordinate, the end point coordinate, and the distance are specified by a command of a machining program. In formula (1), Q denotes a distance from a start point of the circular arc shape to an end point of the circular arc shape.

$$(Xvs, Yvs, Zvs) = \left( \frac{(Q - Mm) * Xs + Mm * Xe}{Q}, \frac{(Q - Mm) * Ys + Mm * Ye}{Q}, \frac{(Q - Mm) * Zs + Mm * Ze}{Q} \right) \quad (1)$$

Then, a point (Xve,Yve,Zve) on the circular arc is obtained by using formula (2) below based on the coordinate (Xvs,Yvs,Zvs) of the origin of the vector, a direction (I,J,K) of the vector, and a length L of the vector.

$$(Xve, Yve, Zve) = \left( Xvs + \frac{Ll*Ii^2}{\sqrt{Ii^2 + Jj^2 + Kk^2}}, \right.$$
$$\left. Yvs + \frac{Ll*Jj^2}{\sqrt{Ii^2 + Jj^2 + Kk^2}}, Zvs + \frac{Ll*Kk^2}{\sqrt{Ii^2 + Jj^2 + Kk^2}} \right) \quad (2)$$

Finally, a circular arc shape, which passes through three points which are the start point coordinate (Xs,Ys,Zs) of the circular arc shape, the end point coordinate (Xe,Ye,Ze), and the coordinate (Xve,Yve,Zve) of the point on the circular arc, is obtained.

Figure 1B:
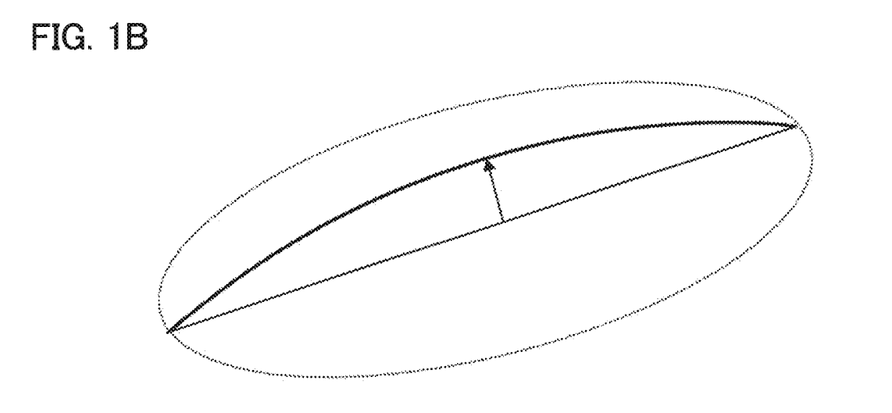

Further, in the present invention, in a case where a curved surface in the form of a spherical surface illustrated in FIG. 1B is machined, a machining shape can be specified by a method same as the above-described circular arc shape specifying method when a length of a line segment, which is obtained by connecting a start point and an end point, is set to a diameter of a circular shape of a base. Here, a direction of a vector is a normal line direction with respect to a base circle in this case.

Figure 4A:
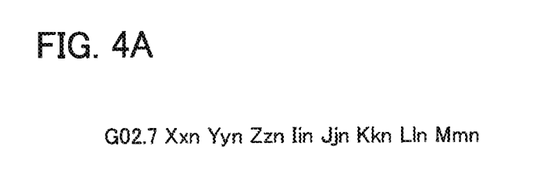
FIGS. 4A and 4B illustrate a method for specifying a curved surface shape command of a semi-curved surface shape according to the embodiment of the present invention.

In order to realize such specifying method, a curved surface shape in the form of a hemisphere surface is enabled to be specified by a curved surface shape command illustrated in FIG. 4A. Here, Xxn denotes an end point coordinate on the X axis direction, Yyn denotes an end point coordinate on the Y axis direction, Zzn denotes an end point coordinate on the Z axis direction, Iin, Jjn, and Kkn denote a direction of a vector from a point on a straight line, which is obtained by connecting a start point and an end point, Lln denotes a length of the vector, and Mmn denotes a distance from the start point of a circular arc to an origin of the vector.

Figure 4B:
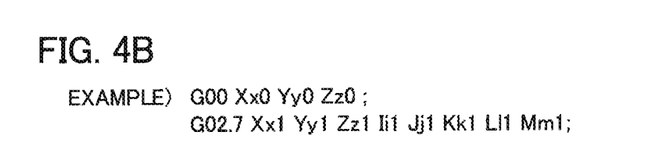

As illustrated in FIGS. 4A and 4B, arguments which can be specified have a similar meaning to that of the above-described arguments of the circular arc interpolation command for specifying a circular arc shape, in a curved surface shape command G02.7. A machining region, which is specified by this curved surface shape command, of a hemispherical shape is within a range of a circle a diameter of which is a line segment obtained by connecting the start point and the end point, and a vector (Iin,Jjn,Kkn) is a normal line vector of the circle.

Figure 5:
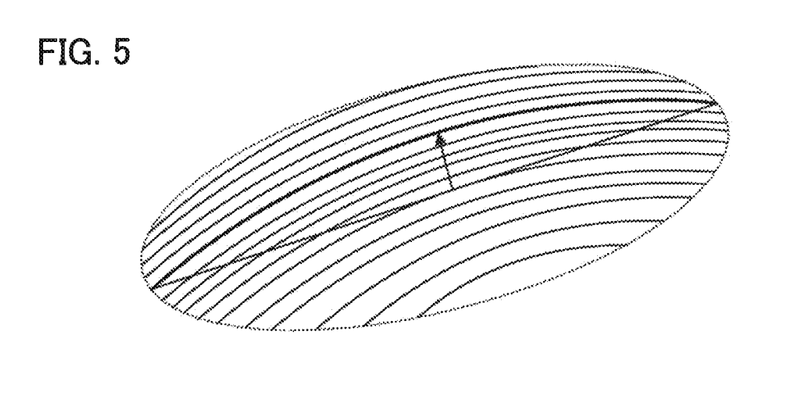
FIG. 5 illustrates a tool trajectory which is calculated in accordance with a program example of the curved surface shape command of a semi-curved surface shape according to the embodiment of the present invention.

A numerical control apparatus to which the present invention is introduced automatically forms a specified tool trajectory on a spherical surface when a machining region of a hemispherical shape is calculated based on a curved surface shape command specified by a machining program. The numerical control apparatus is capable of forming a continuous tool trajectory toward a single direction and is also capable of machining on a contour line in a circumference direction as illustrated in FIG. 5. Intervals of respective tool trajectories may be set in reference to an offset amount in a tool radius direction.

An example of a procedure for forming a tool trajectory of a semi-curved surface based on a curved surface shape command which is specified by a machining program is described below. A coordinate (Xve,Yve,Zve) of a point on a spherical surface is first calculated by using formula (1) and formula (2) based on information, which is specified by the curved surface shape command, of a circular arc shape.

Then, a plane which includes a straight line, which is obtained by connecting a start point and an end point of a circular arc, and is orthogonal to a direction of a vector is obtained.

Further, a circle which exists on the plane, a center of which is a midpoint of the straight line obtained by connecting the start point and the end point, and a diameter of which is a length of the straight line is obtained.

Then, a perpendicular bisector of the straight line, which is obtained by connecting the start point and the end point of the circular arc, on the plane is obtained and an intersection point of the obtained perpendicular bisector and the above-mentioned circle is denoted as a point P. Four points which are the start point of the circular arc, the end point of the circular arc, the point (Xve,Yve,Zve), and the point P are substituted into formula (3) below so as to obtain coefficients A, B, and C. Thus, an equation of a sphere which passes through the four points is obtained.

$$x^2 + y^2 + z^2 + Ax + By + Cz + D = 0 \quad (3)$$

A central coordinate and a radius of a spherical surface shape and a height of a machining region are obtained from formula (3), so that a tool trajectory can be obtained by prior art technique.

As a further application of the present embodiment, a semicircular column shape can be easily specified by a method same as the circular arc shape specifying method described above.

Figure 6A:
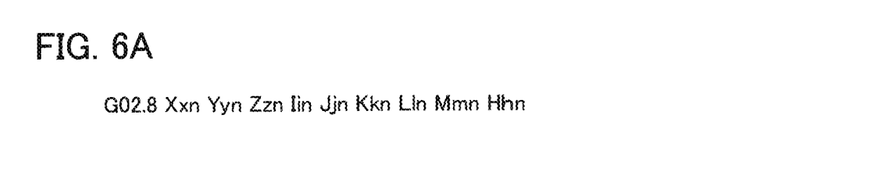
FIGS. 6A and 6B illustrate a method for specifying a curved surface shape command of a semi-circular column shape according to the embodiment of the present invention.
Figure 6B:
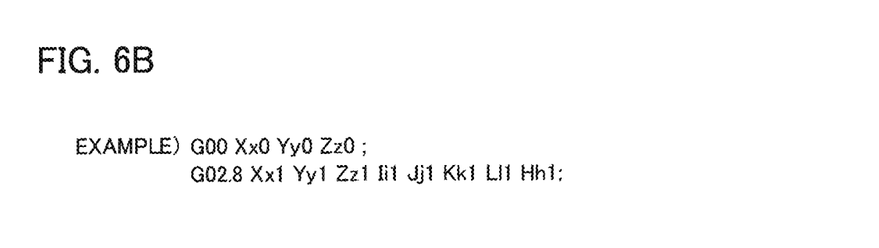

In order to realize specification of a semicircular column shape, a curved surface shape of the semicircular column shape is enabled to be specified by a curved surface shape command illustrated in FIG. 6A. Here, Xxn denotes an end point coordinate on the X axis direction, Yyn denotes an end point coordinate on the Y axis direction, Zzn denotes an end point coordinate on the Z axis direction, Iin, Jjn, and Kkn denote a direction of a vector from a point on a straight line, which is obtained by connecting a start point and an end point, Lln denotes a length of the vector, Mmn denotes a distance from the start point of a circular arc to an origin of the vector, and Hhn denotes a length of a line segment toward a direction orthogonal to the vector centering on the origin of the vector.

As illustrated in FIG. 6A, in a curved surface shape command G02.8, arguments which can be specified are an argument Hhn for specifying a length of a line segment which extends toward an orthogonal direction of the vector and a center of which is the origin of a vector, in addition to a vector equivalent to an argument of a circular arc interpolation command for specifying a circular arc shape described above. A machining region, which is specified by this curved surface shape command, of the semicircular column shape is set to be a range of a shape of a base of a rectangle, central lines of which are a line segment obtained by connecting a start point and an end point and a straight line which is orthogonal to the line segment and has the length Hhn. Further, a vector (Iin,Jjn,Kkl) is a normal line vector of a rectangular shape which is a base of the semicircular column shape.

Figure 7:
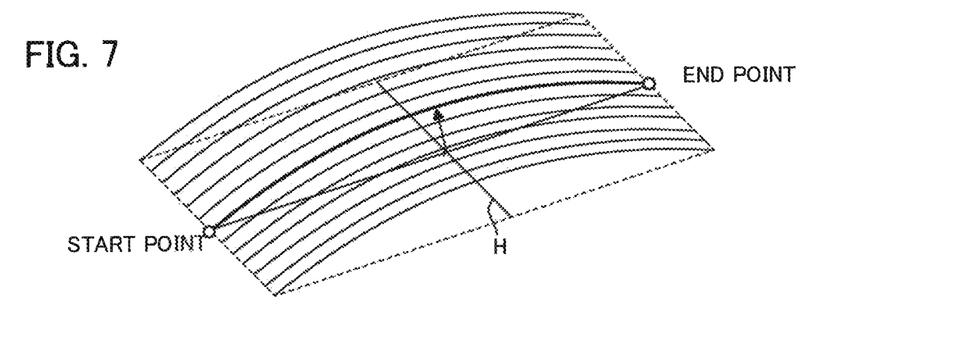
FIG. 7 illustrates a tool trajectory which is calculated in accordance with a program example of the curved surface shape command of the semi-circular column shape according to the embodiment of the present invention.

The numerical control apparatus according to the present embodiment automatically forms a specified tool trajectory on a semicircular column when a machining region of a semicircular column shape is calculated based on a curved surface shape command specified by a machining program. The numerical control apparatus is capable of forming a continuous tool trajectory toward a single direction and is also capable of machining by other tool trajectories, as illustrated in FIG. 7. Intervals of respective tool trajectories may be set in reference to an offset amount in a tool radius direction.

An example of a procedure for forming a tool trajectory of a semicircular column surface based on a curved surface shape command which is specified by a machining program is described below. Two straight lines A and B which are on a plane orthogonal to a specified normal line vector, is orthogonal to a straight line obtained by connecting a start point and an end point, and pass through the start point and the end point of a circular arc shape are first obtained.

Then, a circular arc shape is obtained by the above-described calculation method based on information of the specified circular arc shape. As regarding a circular arc shape adjacent to the circular arc shape which is the central circular arc shape, points are obtained by shifting from the start point and the end point of the circular arc by an offset amount of a radius of a tool, which is used in machining, on the above-described straight lines A and B and the obtained points are set to be a start point and an end point of a new circular arc shape. The circular arc shape can be obtained by a similar method to the above-described calculation method of a circular arc shape.

A circular arc shape group which becomes a tool trajectory can be calculated by repeating the shift up to the range of the length Hh.

Figure 8:
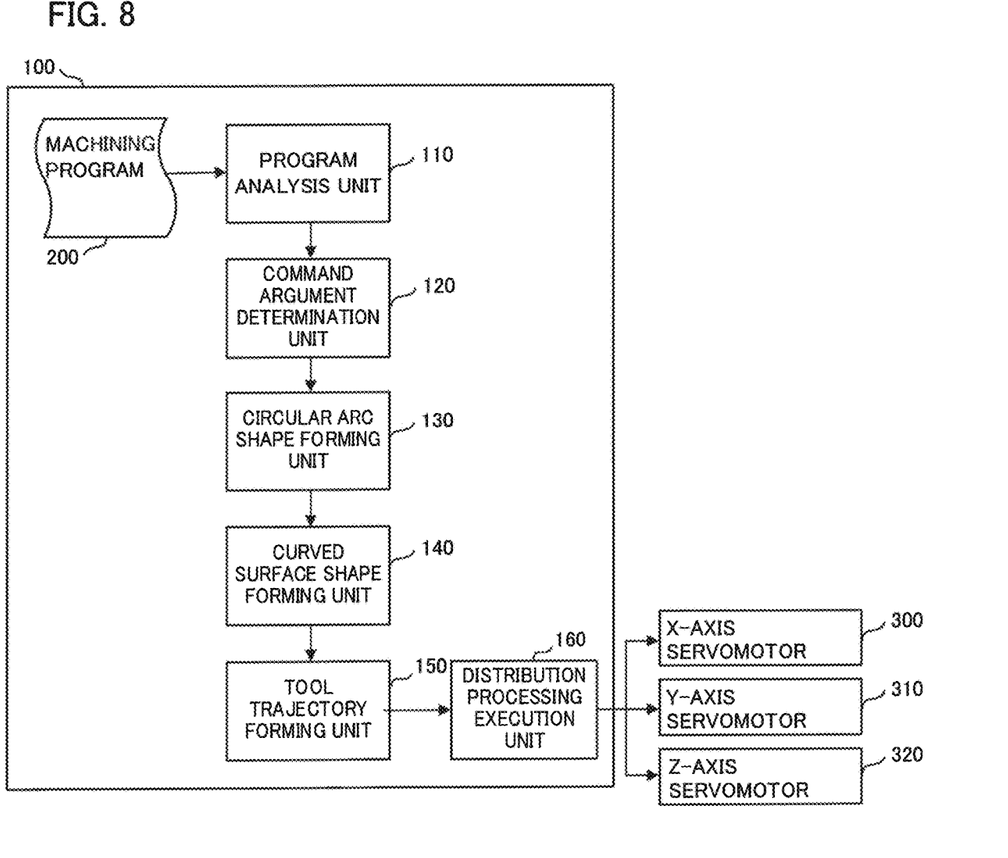
FIG. 8 is a major portion block diagram of a numerical control apparatus according to the embodiment of the present invention.

FIG. 8 is a major portion block diagram illustrating a numerical control apparatus according to the embodiment to which the above-described specifying method of a circular arc shape according to the present invention is introduced. A numerical control apparatus 100 is provided with a program analysis unit 110, a command argument determination unit 120, a circular arc shape forming unit 130, a curved surface shape forming unit 140, a tool trajectory forming unit 150, and a distribution processing execution unit 160.

The program analysis unit 110 reads a machining program 200 from a memory (not illustrated in the drawing) and analyzes the machining program 200 so as to output command data.

The command argument determination unit 120 determines whether a circular arc interpolation command or a curved surface interpolation command is included in the command data outputted by the program analysis unit 110. When the circular arc interpolation command is included, the command argument determination unit 120 analyzes a form of an argument of the circular arc interpolation command so as to determine whether the circular arc interpolation command is a circular arc interpolation command of a vector specifying type. Then, the command argument determination unit 120 commands the circular arc shape forming unit 130 and the curved surface shape forming unit 140 to form a shape, based on the determination result.

In response to the command from the command argument determination unit 120, the circular arc shape forming unit 130 performs circular arc shape forming processing based on an argument specified by the circular arc interpolation command so as to form a circular arc shape.

Further, in response to the command from the command argument determination unit 120, the curved surface shape forming unit 140 performs curved surface shape forming processing based on an argument specified by the curved surface interpolation command so as to form a curved surface shape. Here, the curved surface shape forming unit 140 commands the circular arc shape forming unit 130 to forma circular arc shape which forms a part of a curved surface shape, when the curved surface shape forming unit 140 forms the curved surface shape.

The tool trajectory forming unit 150 forms a movement trajectory of a tool based on the shapes formed by the circular arc shape forming unit 130 and the curved surface shape forming unit 140.

Then, the distribution processing execution unit 160 performs interpolation processing in which the tool trajectory formed by the tool trajectory forming unit 150 is distributed into a movement amount for every distribution cycle, so as to control respective servomotors 300, 310, and 320.

Figure 9:
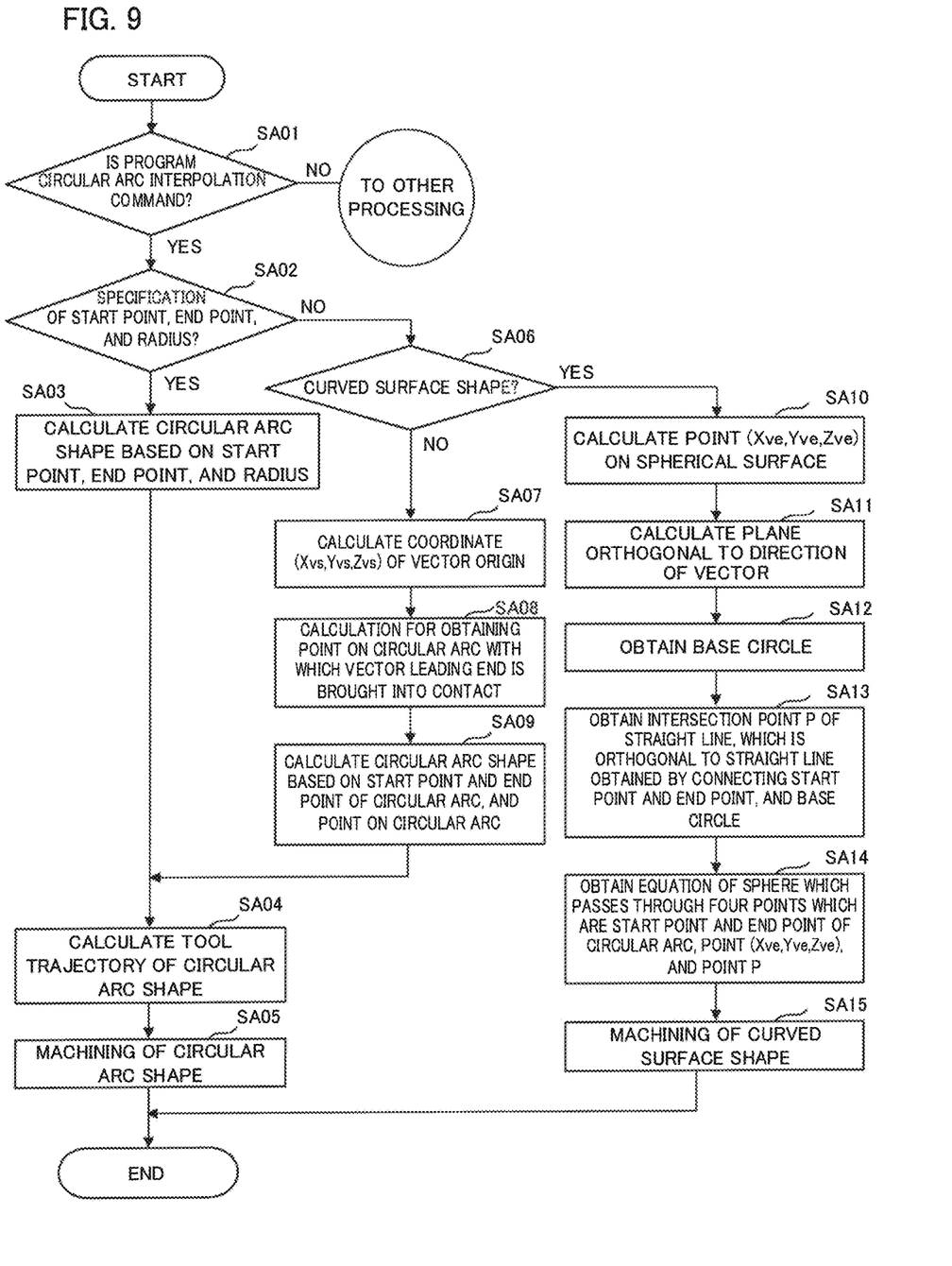
FIG. 9 is a schematic flowchart of processing which is executed on the numerical control apparatus according to the embodiment of the present invention.

FIG. 9 is a schematic flowchart of processing which is executed on the numerical control apparatus 100 according to the present embodiment. Here, processing for forming a semicircular column shape is omitted in this flowchart.

[Step SA01] A machining program is sequentially read and a command is analyzed. When the analyzed command is a circular arc interpolation command (or a curved surface interpolation command), the process goes to step SA02. When the analyzed command is not a circular arc interpolation command (or a curved surface interpolation command), the process goes to processing of other commands.

[Step SA02] An argument of the circular arc interpolation command which is analyzed in step SA01 is determined so as to determine whether the command is a conventional argument specification in which a start point, an end point, a radius, and the like are specified. When the command is the conventional argument specification, the process goes to step SA03. When the command is not the conventional argument specification, the process goes to step SA06.

[Step SA03] A circular arc shape which is specified by the conventional argument specification is calculated.

[Step SA04] A tool trajectory is calculated based on the circular arc shape which is calculated in step SA03 or step SA09.

[Step SA05] A machine tool is controlled based on the tool trajectory which is calculated in step SA04 so as to perform a machining operation of the circular arc shape.

[Step SA06] Whether the command analyzed in step SA01 is a curved surface shape command or not is determined. When the command is the curved surface shape command, the process goes to step SA10. When the command is not the curved surface shape command, the process goes to step SA07.

[Step SA07] A coordinate (Xvs,Yvs,Zvs) of a vector origin is calculated based on the argument of the circular arc interpolation command.

[Step SA08] A coordinate of a point on the circular arc with which a leading end of the vector is brought into contact is calculated based on the argument of the circular arc interpolation command and the coordinate of the vector origin obtained in step SA07.

[Step SA09] The circular arc shape is calculated based on the start point, the end point, and the coordinate value, which is obtained in step SA08, of the point on the circular arc.

[Step SA10] A point (Xve,Yve,Zve) on a spherical surface is calculated based on an argument of a spherical surface shape command.

[Step SA11] A plane orthogonal to a direction, which is specified by the argument of the spherical surface shape command, of a vector is calculated.

[Step SA12] A base circle is obtained based on the argument of the spherical surface shape command.

[Step SA13] An intersection point P of a straight line orthogonal to a straight line, which is obtained by connecting a start point and an end point, and the base circle is obtained.

[Step SA14] An equation of a sphere which passes through four points which are the start point and the end point of the circular arc, the point (Xve,Yve,Zve) on the spherical surface, and the point P is obtained.

[Step SA15] A tool trajectory is calculated based on a curved surface circular arc shape which is obtained in step SA14 so as to perform machining of the curved surface shape based on the calculated tool trajectory.

The invention claimed is:

1. A numerical control apparatus for controlling a machine tool and which enables specification of a movement trajectory of a circular arc shape by a circular arc interpolation command which is included in a machining program, the numerical control apparatus comprising:

a program analysis unit which analyzes the machining program so as to acquire command data;

a command argument determination unit which (i) analyzes a form of an argument of a circular arc interpolation command included in the command data and (ii) determines, based on the analyzed form of the argument, whether the circular arc interpolation command specifies a vector originating from a certain point along a straight line connecting a start point and an end point of a circular arc shape and leading to a point along the circular arc shape, the vector being specified by three coordinate values;

a circular arc shape forming unit which forms a circular arc shape based on the machining program, the start point of the circular arc shape, the end point of the circular arc shape, and a direction and length of the vector, the start point of the circular arc shape, the end point of the circular arc shape, and the vector being specified by the argument of the circular arc interpolation command, when the command argument determination unit determines that the circular arc interpolation command specifies the vector, wherein the circular arc shape forming unit is configured to:

obtain a start point of the vector based on (i) the start point of the circular arc shape, (ii) the end point of the circular arc shape, and (iii) a distance from the start point of the circular arc shape to the certain point along the line connecting the start point of the circular arc shape and the end point of the circular arc shape from which the vector originates, obtain the point along the circular arc shape to which the vector leads based on (i) the start point of the vector, (ii) the direction of the vector, and (iii) the length of the vector, and form the circular arc shape to pass through the (i) the start point of the circular arc shape, (ii) the end point of the circular arc shape, and (iii) the point along the circular arc shape to which the vector leads;

a tool trajectory forming unit which forms a tool trajectory of a machine based on the circular arc shape; and a distribution processing execution unit which controls at least one motor of the machine tool based on the tool trajectory formed by the tool trajectory forming unit.

2. The numerical control apparatus according to claim 1, further comprising:

a spherical surface shape forming unit which forms a spherical surface shape including a circular arc shape which is formed by the circular arc shape forming unit when the command argument determination unit determines that the circular arc interpolation command is a machining command of a curved surface shape; wherein the tool trajectory forming unit forms a tool trajectory based on the spherical surface shape.

3. The numerical control apparatus according to claim 2, wherein the spherical surface shape is a hemispherical surface shape including the circular arc shape, or a semi-circular column shape including the circular arc shape.

* * * * *